United States Patent [19]
Carlin

[11] Patent Number: 5,285,604
[45] Date of Patent: Feb. 15, 1994

[54] CONTAINERIZED FIELD KITCHEN

[75] Inventor: Kevin Carlin, Fresno, Calif.

[73] Assignee: TCBY Enterprises, Inc., Little Rock, Ark.

[21] Appl. No.: 775,705

[22] Filed: Oct. 10, 1991

[51] Int. Cl.⁵ .............................................. E04H 1/12
[52] U.S. Cl. ................................. 52/79.1; 52/79.5; 52/143; 52/362
[58] Field of Search ................ 52/79.1, 79.5, 302, 52/143, 507, 663, 173, 52

[56] References Cited

U.S. PATENT DOCUMENTS

| | | | |
|---|---|---|---|
| 2,219,837 | 10/1940 | Gledhill | 52/302 |
| 2,866,235 | 12/1958 | Couse et al. | 52/586 |
| 2,893,075 | 7/1959 | Potchen et al. | 52/745 |
| 2,904,850 | 9/1959 | Couse et al. | 52/143 |
| 4,601,509 | 7/1986 | Ellis | 296/22 |
| 4,817,360 | 4/1989 | Gorman | 52/747 |
| 4,955,752 | 9/1990 | Ferns | 52/507 |

*Primary Examiner*—James L. Ridgill, Jr.
*Attorney, Agent, or Firm*—Mark I. Feldman

[57] ABSTRACT

A special mobile kitchen provides an impact-resistant food service trailer and a rapid deployment, containerized field kitchen unit which can be quickly transported to a remote field location by helicopter or other aircraft as well as by ship or land transportation. Advantageously, the mobile kitchen has thermally insulating composite walls so that the kitchen unit can effectively function even at freezing temperatures and dessert conditions. The composite walls can be readily assembled from modular components comprising lightweight, high strength fiberglass panels for easy storage and economical transport. Desirably, the high tech panels are constructed with numerous access openings for ready access to work stations in the kitchen for better service, repair, maintenance, and adjustments and for enhanced supply and delivery of food. During storms and inclement weather, the access openings can be closed and secured with impact-resistant doors and shutters.

16 Claims, 3 Drawing Sheets

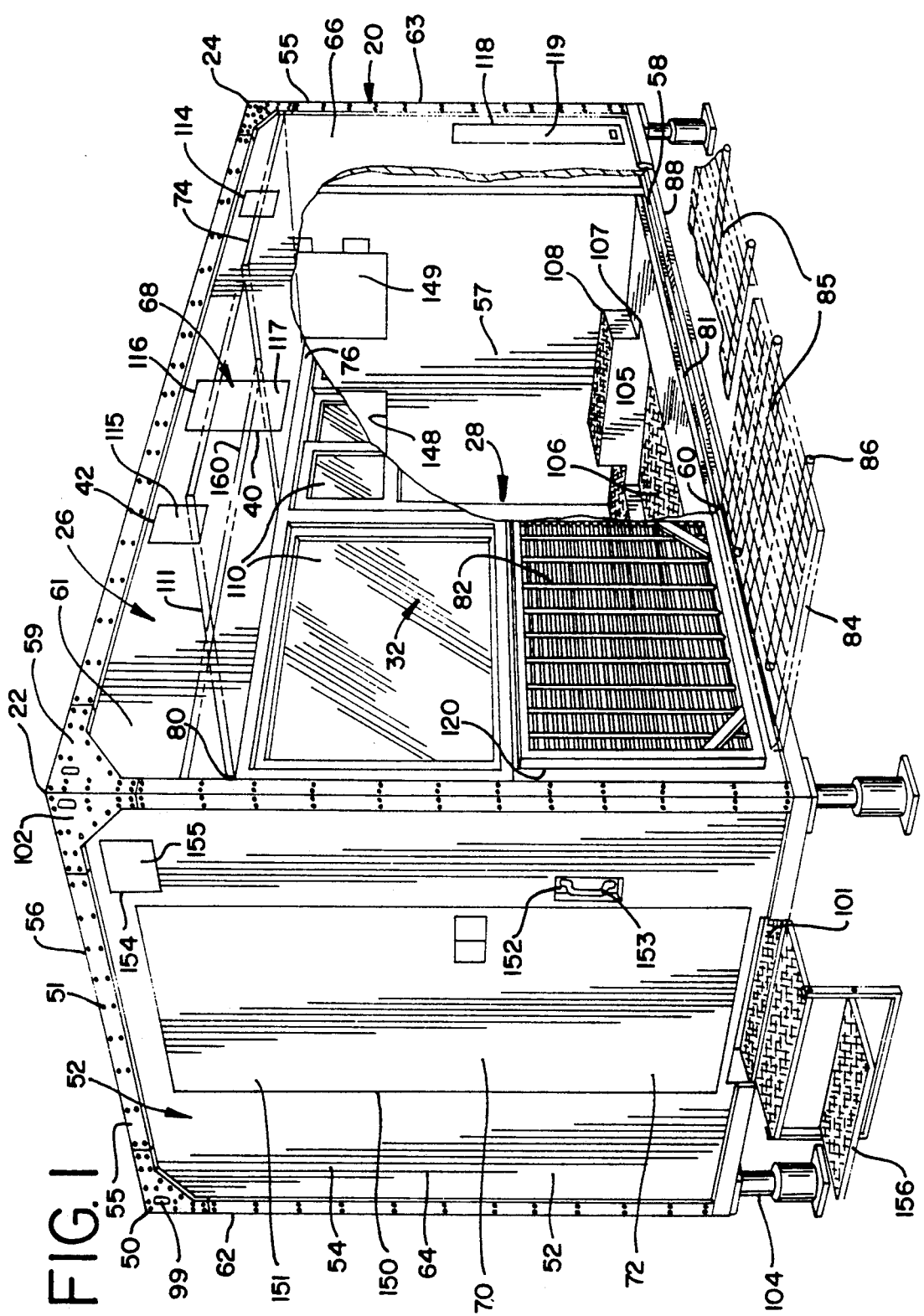

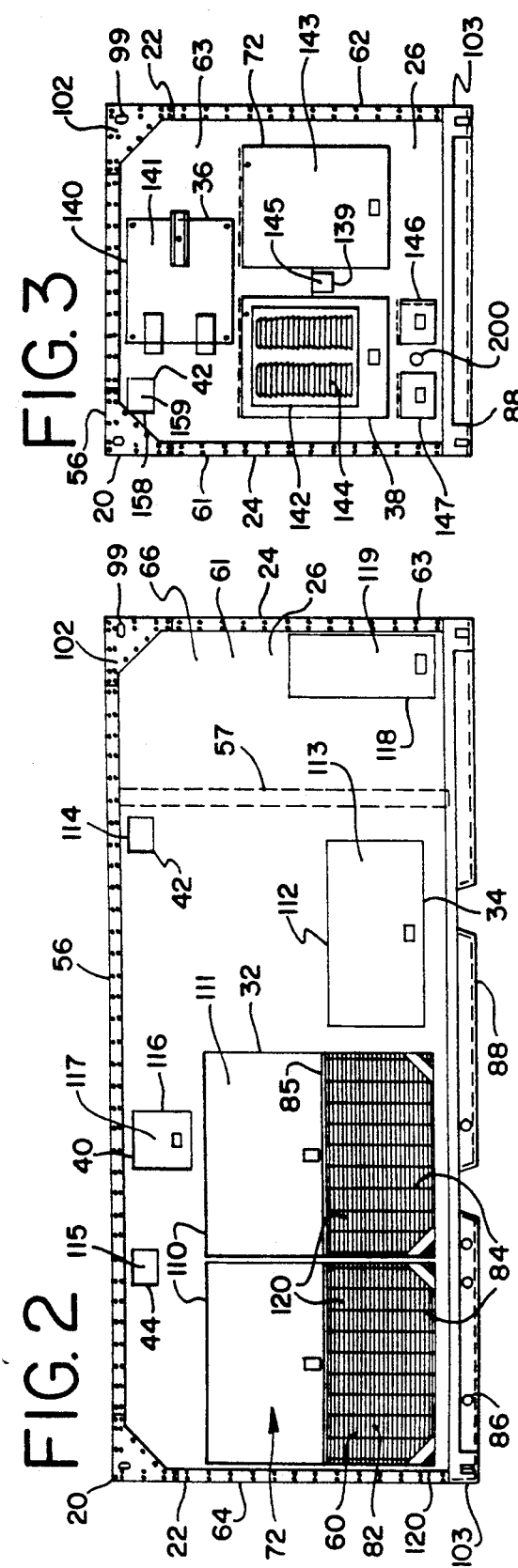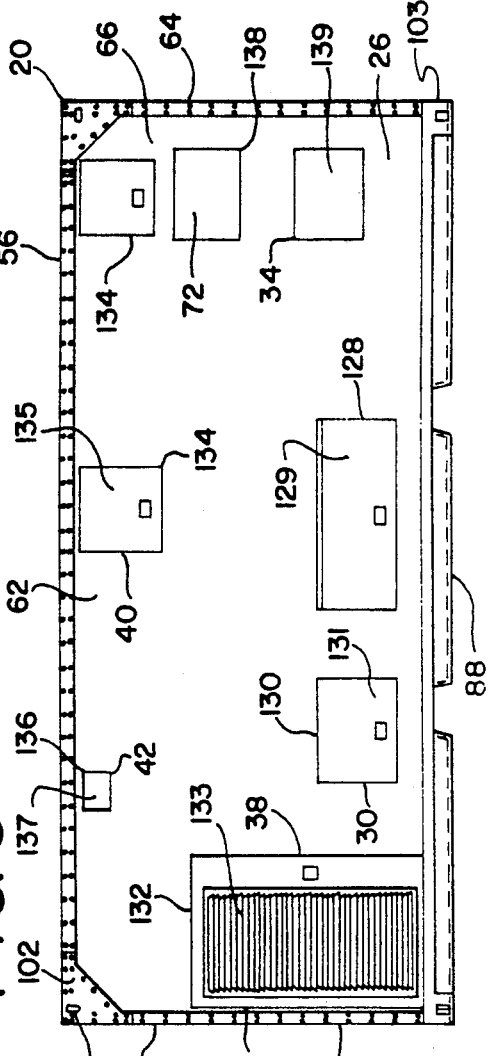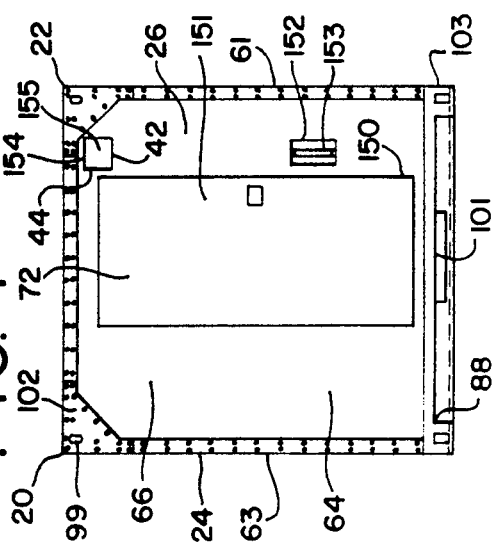

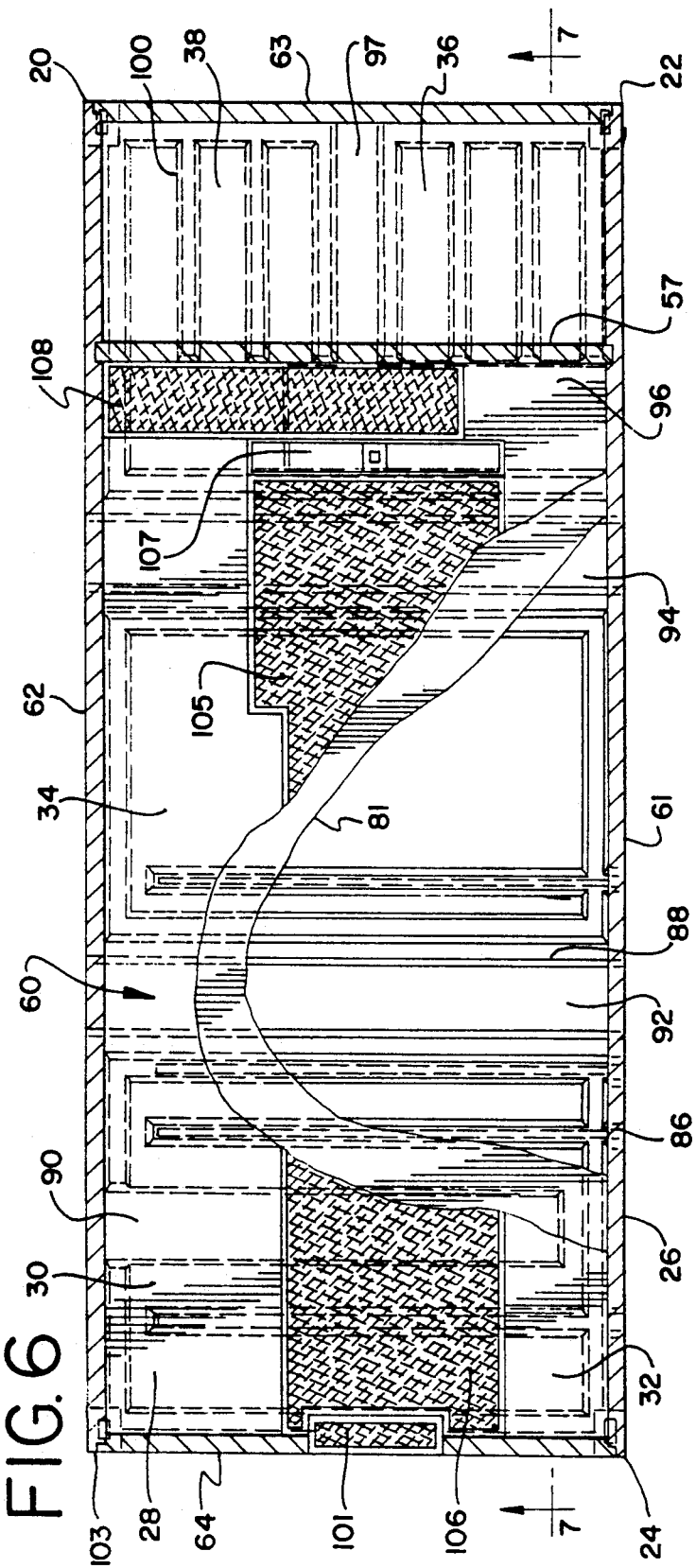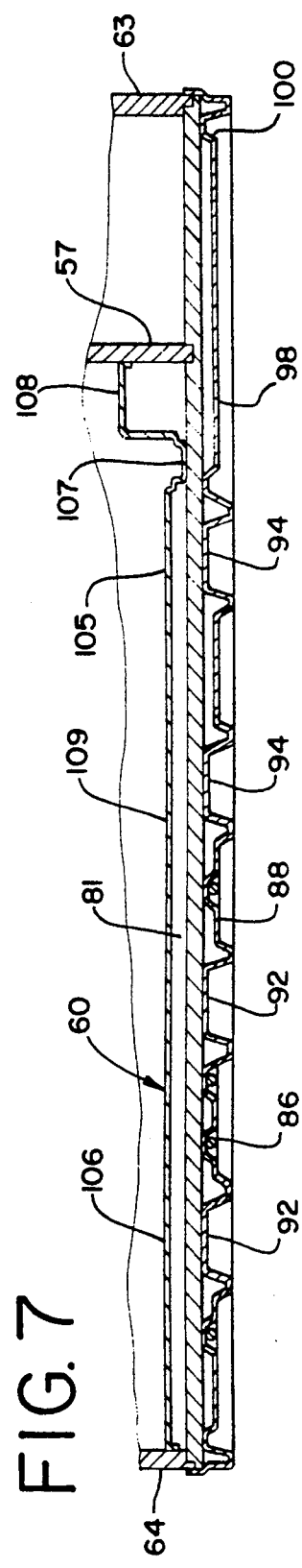

CONTAINERIZED FIELD KITCHEN

BACKGROUND OF THE INVENTION

This invention relates to food service trailers and, more particularly, to a containerized field kitchen for military operations and warfare.

Over the years, numerous vending carts, mobile kitchens, concession vans and trailers have been constructed for fast food chains and others to serve pizza, hamburgers and chicken and provide off premises catering and emergency service. Mobile kitchens have been built in sizes ranging from 12 feet to 48 feet in length and have been offered in truck and trailer chassis. Typically, the mobile kitchens are fabricated of aluminum or steel and are equipped with stainless steel counters and food service equipment.

If a single trailer does not provide enough floor space, multiple units are sometimes connected through a rain-tight passageway. Such multiple units can provide high volume food service with dish washing and high volume cooking equipment. Such heavy duty equipment is available for use at correctional facilities, hotels and contract feeding sites when land based kitchens experience downtime due to remodeling.

High bobility kitchens constructed of steel and other metal have been provided for feeding military and emergency service personnel. They have been operated by state departments of forestry and fire protection for emergency operations support. High mobility kitchens have been constructed on wheeled trailers and have been fully enclosed for security, sanitary conditions necessary in the preparation of food, and protection from the elements. Such wheeled trailers are often pulled by diesel powered cabs.

A variety of other mobile units have also been provided, such as: command vehicles and field offices, mobile communication centers, emergency service units and vehicles, mobile convenience stores, demonstration and display vehicles, mobile showrooms, mobile sound stages, mobile decontamination and showering facilities, mobile medical units, mobile restroom facilities, book mobiles, interior control centers, and mobile command posts for fire and police departments.

Some command vehicles and other mobile units are equipped with a field office, conference room, communications room, engineering office, galley, rest rooms (toilets) and storage compartments. The conference room can be elevated to enhance the view through large tinted safety glass windows. Captain chairs, sofa, and television video systems can be included. The engineering office can have built-in file drawers and bookshelves. Map reading table or drafting stations are also available in these units with cabinets and storage compartments. The communications room can be equipped with a variety of options including: base station radios, telephones, facsimile machines, computers, and video surveillance systems. Galleys can include refrigerator freezers, microwave ovens, coffee maker and sink. Sound proofing materials can be used in the exterior walls, floors and ceiling to provide a quieter work environment. The self-contained mobile units can have an electric power generator, a water tank, and a heating and air conditioning system. The mobile unit can further have standard scene light for perimeter illumination as well as illuminated control panels.

Composite containers have been used as communication shelters. These composite containers have been supported, reinforced and framed with rigid metal support frames, such as by a steel frame or aluminum frame.

During recent military maneuvers and operations, high ranking military officials become concerned on the inadequate ability to feed troops in the field with hot meals. Frequent use of T-rations, ready to eat meals (MRE) and dehydrated foods are often deleterious on the morale, well-being and fighting capacity of military personnel. Furthermore, during Operation Desert Storm in Kuwait, the U.S. military and its allies experienced problems with many cooking tents which shredded from wind and blowing sand. Sand, dirt and other debris also seeped through the canvas tents into the food. The existing cooking tents have no air conditioning, heating, refrigeration for food or running water.

It is therefore desirable to provide an improved containerized field kitchen which overcomes most, if not all, of the preceding problems. To this end, it is further desirable that a containerized field kitchen be provided for use in remote locations and theaters of military operations. The containerized field kitchen should be transportable by cargo ships, helicopters and transport planes and should be light weight to accommodate airlift. Aircraft also use less fuel with lighter containerized field kitchens and cargo. The containerized field kitchen should further be transportable by helicopter and be able to withstand a drop of up to 2 feet from the helicopter without damage to the unit or its accessories and contents.

SUMMARY OF THE INVENTION

As an alternative to the cooking tent, the containerized field kitchen unit offers the following advantages:

Desirably, the novel containerized field kitchen is constructed and designed to be readily shipped to the remote field locations by a transport carrier, such as: a helicopter, C140 cargo plan or other aircraft; ship; train; truck; or an all terrain vehicle. For airborne shipment and precision drop placement, the containerized field kitchen preferably comprises an impact-resistant composite panel system with sufficient structural strength and integrity to be dropped two feet by a helicopter or parachute without damaging or significantly impairing the operation and use of the containerized field kitchen and its contents. In order to enhance transport, the containerized field kitchen has ISO corners mounting to ISO mobilizers. The containerized field kitchen can be equipped with elevating jacks, or stabilizing feet. The containerized field kitchen can also be secured for use on a flat bed trailer or on the bed of a truck. Preferably, the containerized field kitchen has refrigeration, hot and cold water, heat and air-conditioning.

In the preferred form, the improved containerized field kitchen comprises a rigid weather resistant, non-corrosive, chemically inert, hard wall shelter with a rain-impermeable, wind-resistant, thermally insulating composite housing to resist the elements of nature, such as: wind, rain, snow, ice, hail, sun, and sand storms. Desirably, the thermally insulating containerized field kitchen unit can effectively operate at ambient outside temperatures ranging from about −50 degrees F. to about +120 degrees F. without permanent deformation, buckling or other damage to the structural integrity of the containerized field kitchen. For reduced weight, economy, and ease of transport, the composite housing is fabricated of composite modular components having a greater structural strength and lighter weight than aluminum. The composite modular components are comprised of composite materials such as fiberglass.

In the illustrative embodiment, the composite housing has: a top wall providing a ceiling and roof; a composite floor; and upright walls including longitudinal side walls and lateral end walls peripherally surrounding an array of stations in the interior of the containerized field kitchen unit, such as a beverage station, food dispensing station, etc. Desirably, the upright walls are fabricated of lightweight composite panels which are easy to erect without a bulky heavy steel, aluminum, or other metal support frame to support the structure. In the preferred form, each of the composite panels has at least one access opening to provide a passageway, entrance, port, window, hatch, hole, inlet, outlet, or conduit communicating with the interior of the containerized field kitchen unit, for access and service to one or more of the interior stations in the containerized field kitchen. A closure assembly, such as a door, or shutter, is provided to close the access opening. A rivet bolster is mounted on the wall adjacent the access opening to provide a surface to pivotally connect the door or shutter to the wall.

In the illustrative embodiment, the composite skid comprises a collapsible deck and staircase assembly which has two collapsible, adjustable and removable platforms, supported by a series of elongated telescopic tubes providing a set of support beams. A unitary one-piece molded floor liner, preferably fabricated of impact-resistant composite, can be installed with a slip-resistant surface for enhanced safety and a drainage trough for easier cleanup. Conveniently, the deck and stairs (staircase) are readily collapsible for storage into the wall panels during transit and non-use.

The kitchen can be equipped with ducting for heating, air-conditioning, make-up air and ventilation. Desirably, the ducts are fabricated or molded of a shape-sustaining sound-attenuating flame-resistant material, preferably Kydex (by Rohm and Haas), to decrease vibration and noise from equipment in the containerized field kitchen, such as from the generator, heater, air conditioner, etc. The ducts can be positioned along the ceiling above the center aisle, from the front end wall to the rear end wall, and can be positioned adjacent the top of the interior divider wall.

The surfaces of the walls can be sprayed or otherwise coated with a composite gelcoat to withstand abrasive scrubbing, stringent cleanup and sanitizing (sanitation) often required after a biological or chemical attack. The composite gelcoat protects the color and finish of the walls. The composite gelcoated panels and walls also help resist corrosion and biological and chemical attack.

A more detailed explanation of the invention is provided in the following description and claims taken in conjunction with the accompanying drawings.

BRIEF DESCRIPTION OF THE DRAWINGS

FIG. 1 is a perspective view of the containerized field kitchen in accordance with principles of the present invention with portions broken away for ease of illustration and clarity and showing in phantom or dotted line walkway assist grates;

FIG. 2 is a curb side view of the containerized field kitchen;

FIG. 3 is a front end view of the generator compartment and refrigeration end of the containerized field kitchen;

FIG. 4 is a rear view of the entrance end of the containerized field kitchen;

FIG. 5 is a road side view of the containerized field kitchen;

FIG. 6 is a top elevational view of the floor assembly of the containerized field kitchen with portions broken away for ease of illustration and clarity; and FIG. 7 is a fragmentary cross-sectional view of the floor assembly taken substantially along line 7—7 of FIG. 6.

DETAILED DESCRIPTION OF THE PREFERRED EMBODIMENT

The containerized field kitchen 20 (FIG. 1) provides a moveable containerized field kitchen unit 22 comprising a transportable impact-resistant food service structure on trailer 24. The structure 24 is constructed of interconnecting modular components designed for transport by a carrier, such as an aircraft, ship, train, truck, or an all terrain trailer, to a remote field location to feed personnel at the remote field location. The modular components are relatively compact and are of a sufficiently small size and weight as to be capable of shipment in a C140 or other similar military air craft. Advantageously, the impact-resistant structure 24 has sufficient structural strength and integrity to permit the trailer 24 to be dropped from at least two feet above the remote field location by a helicopter without structural damage or impairing the integrity and operability of the containerized field kitchen unit.

The field kitchen unit 22 has an array, set and series of service stations to dispense food or beverages, and which are in communication with and accessible to each other. These stations include: a beverage station 30 (FIG. 5) providing an area for serving coffee and beverages; a food dispensing station 32 (FIGS. 1 & 2) providing an area for dispensing prepared food; a cooking station 28 (FIG. 1) providing an area for cooking food including cooking equipment, such as a 20 gallon kettle, 15 gallon skillet, steam table, 2 ovens, grill or griddle that can sit on a 2 drawer refrigerator; a refrigeration compartment station 149 (FIGS. 1 and 6) for refrigerating food; an equipment compartment 38 (FIGS. 3 and 6) comprising a power generator for supplying electrical power with power equipment, such as an electrical control panel; and an exhaust and make-up air system 40 (FIGS. 1, 2 and 5) for discharging smoke and fumes to the atmosphere with an exhaust fan. There are overhead lights 44 (FIGS. 1, 2 and 5) for illuminating the cooking, food dispensing and beverage stations. A trash compactor can be placed between the generator and the sink.

The containerized field kitchen structure 22 (FIG. 1) provides a rigid weather-resistant assembly comprising a rain impermeable wind-resistant thermal insulating housing 52. The structure 22 is impervious to rain and snow and resistant to sun, wind, hail and sand storms so that the containerized field kitchen 20 can operate at the remote field location at ambient outside temperatures ranging from −50 degrees F. (Fahrenheit) to +120 degrees F. without permanent deformation or structural damage to the structure 24. This insulated structure maintains a comfortable working temperature inside the kitchen at extreme temperatures.

The structure 22 (FIG. 1) has adhesive and rivets 51 connecting corrosive resistant, composite, generally rectangular wall panels 54. The rivets 51 pass through holes adjacent the edges of the walls 54. Peripheral elongated bolster strips 55 and corner members 59 provide surfaces through which the rivets 51 pass. The peripheral bolster strips 55 can be embedded in the composite walls 54 to provide additional strength. The corners can be trimmed with composite angles so that seams and rivets can be hidden. The interior surfaces of the walls 54 can be equipped with receptacles and passageway conduits, or pipes for plumbing and electrical wires.

The composite walls 54 include: a top wall 56 providing a horizontal ceiling and composite roof, above the stations 28, a one-piece seamless floor liner 60 and upright vertical composite walls 61–64 (FIGS. 1–2) which extend between and connect the top and bottom walls 56 and 58 and which peripherally surround the kitchen 28. The composite wall panels can have studs. The wall and ceiling intercostal or supports are unique in the fact that they are typically made of aluminum or steel. This invention introduces a unique mandrel wound structural fiber foam core composite. An upright composite interior divider panel 57 (FIGS. 1 and 6) provides an interior partition and wall. The divider panel 57 provides a dove tail sound attenuating barrier for dampening and insulating noise produced by the generator in the equipment compartment 38. The upright walls 61–64 include longitudinal side walls 61 and 62 and lateral front and rear (back) end walls 63 and 64. The longitudinal side walls 61 and 62 can define a curb side wall 61 (FIG. 2) and a road side wall 62 (FIG. 5). The end walls 63 and 64 are perpendicular to and extend between and connect the side walls 61 and 62. The upright composite walls 61–64, ceiling and skid are fabricated of an advanced structural composite fabricated without a steel, aluminum, or other rigid metal support frame to support, extend between and connect the panels 66. The composite panels 66 have a structural strength and tensile strength greater than aluminum and is lighter in weight than aluminum for easier, less expensive transport. This strength is achieved through this unique mandrel wound structural fiber foam core composite intercostals.

Each of the upright walls 61–64 comprising the composite/foam core panels 66 has at least one access opening 68 (FIG. 1) to provide a passageway, entrance, port, window, hatch, inlet, outlet, or conduit communicating with the interior of the containerized field kitchen unit 22 for access and service to one or more of the interior stations 28 in the containerized field kitchen 20. A closure assembly comprising a manually moveable closure member, such as a closure door 72, shutter 134, or hatch 129, is provided to close the access opening. A rivet bolster 150 can be mounted on the wall adjacent the access opening to pivotally connect the door 72 or shutters 134 to the wall.

The one-piece floor assembly 60 (FIGS. 1 and 6) comprises a composite material which includes a non-skid surface aisle 106, an equipment curb 81, a recessed floor drain 107 for easy cleaning, and a molded step 108 to access the reefer compartment. This coved, one piece floor liner is designed to facilitate cleaning the kitchen floor. The decks 85 disconnect and travel in a recess positioned against one of the upright walls 61 during non-use. A series, set, and array of parallel elongated rigid molded tubes 86 provide a set of telescopic support beams which can slide outwardly of the curbside wall 61 to an exterior position below the ramps 85 to support the ramps 85. The base 88 acts as utility basement and a skid which receives and supports the tubes 86. The skid (base) 88 has an equipment storage compartment 90 (FIG. 6). The base 88 also has two pairs, sets and series of molded forklift pockets 92 and 94 that provide tine-receiving slots which can receive the tines of a forklift truck as well as grab hooks from a helicopter. The base 88 can be molded to provide a waste water tank space 96 and waste water hose storage 97. The base 88 can also be fabricated with generator supports 100 to support the generator in the equipment compartment 38.

All four corners of the top 56 and base 88 (FIGS. 1–6) can be equipped with molded composite ISO corners 102 and 103 comprising composite corners molded with aluminum or steel inserts. The top (upper) ISO corners 102 have openings 99 for the unit 22 to be lifted by a crane and helicopter. The bottom ISO corners 103 are useful so that the unit 22 can be bolted to a flat rack truck bed, trailer bed or lashed to the deck of a ship. A set and series of manual jacks 104 can engage the corners 103 of the base 88 to elevate the floor assembly 60 above the ground.

A unitary one-piece molded composite washable floor liner 105 (FIGS. 1, 6 and 7) is positioned above and supported by the skid 88. The composite floor liner 105 has an upper slip-resistant surface 106 providing a non-skid aisle to enhance safety of kitchen personnel and has a drainage system comprising at least one integral floor drain providing a drainage trough 107 for drainage of dishwater and other liquid. One or more steps 108, located at the front end of the floor liner 105, provide elevation and access to the refrigerator. A syntactic foam sheet 109 is laminated to the floor liner to improve the R factor of the floor. In the illustrative embodiment, the composite panels 66 comprise an upright curbside composite panel 61 (FIG. 2) providing the curbside wall. The curbside panel 61 can be positioned adjacent the food dispensing station 32. Recessed illumination floodlight openings 114 illuminate the food service area (food dispensing station) 32. Additional features molded into the curbside wall include an exhaust fan opening 116 and shutter 117 are positioned above the food service windows 110 and cooking area 34 and an electrical panel opening 118 and door 119 communicating with an electrical panel and generator in the equipment compartment 38.

The curbside panel 61 (FIGS. 1 and 2) can also have a pair or set of rectangular indentations and recesses 120, positioned in horizontal alignment below the food service windows 110, to store a pair or set of composite, rectangular, walkway assist grates 84 during transport, storage and non-use. The moveable composite grates 84 provide adjustable, foraminous rectangular decks 85. The grates 84 can comprise composite grills with matrixes of interconnected horizontal and vertical composite grating bars. The grates 84 are particularly useful when the vehicle comprising the containerized field kitchen 20 is carried and secured for use on a flat bed trailer or on the bed of a truck. In use, the grates 84 are moveable to an outward horizontal position which extend outwardly from the curbside panel 61. Adjustable steps or a staircase mounts to the deck so that customers can step up and walk on to the deck 85 for better access to the serving (food service) windows 110. The grates 84 may not be required for use as walkways when the containerized field kitchen 20 is elevated by jacks 104 a short distance above the ground. For storage and transport, as well as during periods of inactivity, the grates 84 can be moved to an upright vertical position in the recesses 120 against the curbside wall 61. Composite grates are preferred for ease of moving and positioning and lighter easier, more economical transport. These composite decking grates are preferred to metal since they will not rust. It is a feature that no tools are required to assemble the steps and deck.

The composite panels 66 of the illustrative containerized field kitchen 20 can further include a roadside upright composite panel 62 (FIG. 5) providing the roadside wall. The roadside panel 62 also has a set, series, and array of access openings and closure doors, such as: a beverage window 130 and shutter (door) 131 for access to the beverage (coffee) station 30; a loading hatch and port 128 with a loading door 129 to dispense packaged food to be transported in insulated food carriers, to jeeps or other vehicles for transport to the field; a generator access opening 132 and acoustically insulated louvered generator inlet door 133 for access to and removal of the generator in the equipment compartment 38; exhaust fan openings 134 and doors 135 communicating with the exhaust system 40; a recessed floodlight opening and scene light 136; and oven access openings 138 and plates 139 for access to and communicating with ovens, such as convection ovens, in the cooking station or kitchen 28.

In the illustrative embodiment, the composite panel 66 also has refrigeration and generator access hatches 141 and 143 (FIG. 3) and can be positioned in proximity to the refrigeration station 36. The front panel 63 also has a series, set and array of access openings with closure doors, such as: a refrigeration compartment hatch and opening 141 so that a delivery truck can load food into the refrigerator; a generator maintenance door or hatch 143 and an acoustically louvered door 144 with vents communicating with the generator in the equipment compartment 38; a fuel filling opening 145 providing a filler neck and door 139 communicating with the power generator for filling the generator with diesel fuel or JP8 jet fuel; water inlets and openings providing water conduits 146 providing communication and connection to the sinks. Also provided is a recessed floodlight 158.

As shown in FIG. 6, the containerized field kitchen 20 can also have a composite divider panel 57 providing an interior wall to separate the refrigerator and generator compartments 36 and 38 from the cooking, beverage, and food dispensing stations 30-34. This interior partition is formed of a foam core composite panel laminated with a sheet of lead to deaden the sound from the generator. This wall "floats" or is suspended by a rubber gasket material to assist in reducing noise from the generator and equipment compartment. The divider panel 57 (FIG. 1) has molded refrigerator door openings 148 with interior doors 149 for access to the refrigerator compartment 36. The refrigerator door openings 148 provide passageways so that food can be passed from the refrigerator into the cooking area 34 of the kitchen.

As shown in FIGS. 1 and 4, the composite panels 66 of the illustrative containerized field kitchen 20 include a rear or back composite panel 64 providing the entrance end rear wall. The rear panel 64 is positioned across from the front panel 63. The rear panel 64 further has a plurality, series, set, and array of access openings with closure doors, such as: an entrance way 150, with solid entrance (entry) door 151 for passage of kitchen personnel, a grab handle recess 152 for a grab bar handle 153, and a recessed floodlight 154. A foldable staircase 156 comprising collapsible stairs with assist steps can be placed at the entrance 150. Stairs can also be placed at the decking 85.

The containerized field kitchen 20 is a carefully engineered food service vehicle that is formed of an advanced composite panel, instead of metal. The preferred materials are an expanded polymer core sandwiched between a composite interior and exterior panel. The composite material may comprise fiberglass. This composite panel system has a higher strength-to-weight ratio than aluminum or steel monocoque construction. The composite fiberglass panels 66 provide excellent thermal insulation. Thermal insulation in the containerized field kitchen is superior because all materials in the conduction path are true insulators. The composite containerized field kitchen is lighter than bulky prior art steel and aluminum containers. Furthermore, the containerized field kitchen does not readily conduct heat and is chemically inert so that it resists corrosion. Desirably, the composite panels 66 can pass the U.S. Army Chemical Warfare sanitation criteria.

The containerized field kitchen can utilize rivet bolsters fabricated of strips of aluminum around the perimeter of each panel 61-64 and along door hinges of the panels to provide a rigid surface to receive rivets. The aluminum rivet bolster strips are advantageous for getting secure riveted connections between panels, but do not provide substantial additional rigidity, support or structural strength for the panels.

Prior art steel, aluminum and other metal cargo containers conduct heat and act as thermal shunts. The advanced composite panel system, constructed without a metal frame, of the present invention is more efficient and conducts less cold and heat. This is important and useful for field operations performed in extreme temperatures.

The containerized field kitchen can be elevated on jacks 104 (FIG. 1) when it is in operation. The jacks 104 can lift (elevate) the unit 12-18 inches above the ground to facilitate loading supplies into and out of the unit.

In the preferred embodiment, the dimensions of the containerized field kitchen are 8½ feet tall, by 8 feet wide, by 20 feet in length, so that it can be adapted to fit into cargo ships, helicopters and transport planes, just like a standard size cargo container. Preferably, all the exterior hardware of the unit 22 is flush mounted with the walls 54 so that the overall dimensions of the unit do not exceed 8½ feet tall by 8 feet wide by 20 feet in length required for aircraft and overseas transport. Most preferably, the containerized field kitchen weighs less than 15,000 pounds for easier air transport. The containerized field kitchen can also be mounted on a flat bed trailer or on the bed of a truck.

One of the many features of the containerized field kitchen is that the walls 54 of the unit 22 are designed and molded so as to provide a plurality of openings to provide serving windows and loading ports for access and communication. Doors and openings are designed into the walls of the container to enable food to be loaded and dispensed. Since prior art standard metal cargo containers usually only have a barn-type door at the back of the unit, the limited number and nature of the openings in the prior art cargo container did not facilitate use of the prior art cargo container as a mobile kitchen. The specially designed containerized field kitchen of the present invention hass doors 72 or shutter 74 on all four upright walls 54 to cover and close the access openings 68.

FIG. 2 depicts the curbside panel 61 of the illustrated containerized field kitchen 20. The curbside wall 61 defines two openings 110 which provide serving windows where personnel walk up to receive food. Opening 112 defines a service compartment and chamber for providing exterior repair access to the equipment in the interior of the containerized field kitchen without walking inside the containerized field kitchen. Opening 116 is provided for an exhaust fan. Opening 118 provides access to the electrical panel of the kitchen. There are also two recesses 114 near the top of the curbside panel 61, adjacent opposing ends of the panel 61, for floodlights to illuminate the unit 22 and the area around it to facilitate the use of the containerized field kitchen. Each of the openings 110, 112, 116, and 118 is covered by a door 72, such as door 111, 113, 115, 116, 117, or 119, which is closed when the unit 22 is transported or not in use. The doors 72 can be hinged at the top, side or bottom depending on its intended use. Above each of these openings can be an aluminum strip or rivet bolster where the doors 72 can be riveted to the panel.

FIG. 5 illustrates the roadside panel 62 of the containerized field kitchen 20. In order to keep the flow of traffic (people) generally uniform around the unit 22, beverages are typically served on the road side of the kitchen, and food is served on the curbside. Opening 132 provides exterior access to the generator compartment of the power station 38. The generator can supply electrical power for the kitchen. A shore power connection is also offered in the event 60 hz or 50 hz power is available. An aluminum rivet bolster 80 can be positioned on the left where the door 133 to the generator compartment is hinged. Opening 130 provides access to the coffee and beverage station 30 which may be self-service. An aluminum rivet bolster can be placed on the bottom of the opening 130, where the door 131 is hinged so that the door 131 can be dropped down and opened to provide access to the coffee and beverage station 30. Opening 128 defines a loading hatch which can be used as a dispensing port for package food. For example, food which is prepared in the kitchen can be dispensed from loading hatch 128 to a vehicle, such as a jeep or truck, which can transport the food to a group of soldiers in remote locations, if desired. An aluminum rivet bolster can be placed at the bottom of the opening 128, and the door 129 can be hinged at the bottom and can be dropped down to provide access to the loading hatch 128. Openings 134 are for exhaust fans for the discharge of hot air and exhaust fumes from the kitchen. Aluminum rivet bolster strips can be mounted at the top of these openings 134 to pivotally connect hinged covers (doors) 135 for the exhaust fans. A pair of oven access openings 138 are covered by plates or doors 139. The plates or doors 139 can be secured to the roadside panel 62 by screws. The plates or doors 72 can be removed to provide exterior access to repair and service the cooking ovens in the kitchen. A recess 136 near the top of the roadside panel 62 is positioned above the coffee and beverage station 30 for a floodlight to illuminate the coffee and beverage station 30.

FIG. 3 shows the front panel 63 comprising the front end wall of the containerized field kitchen. In the illustrative embodiment, there are openings 140, 142, 145 and 146 on the front panel 63. Opening 140 defines a refrigerator loading hatch. Through this opening 140 food from a refrigerated truck can enter the containerized field kitchen from the outside and can be loaded into a refrigerator. The front panel 63 also has a pair of openings 142 for an acoustically louvered door 144 with vents to allow the generator to dissipate heat and provide for air flow into the equipment compartment 38 so that the generator will not overheat. Opening 145 defines a filler neck for filling the generator with diesel fuel or JP8 jet fuel. Opening 200 is a shore power connection for connecting electricity. Opening 146 provides a water inlet and conduit for the sink or other plumbing. Opening 147 is an opening for the diesel JP8 generator exhaust. The exhaust is ducted to the roof through a metal exhaust stack that has been jacketed and insulated. This exhaust stack is designed to breakdown into small pieces for transport.

The rear panel 64 comprising the rear wall of the containerized field kitchen is shown in FIGS. 1 and 4. A large entry door 151, such as about 6 and ½ feet high and 3 feet wide, can be hinged on the left and secured to the rear panel 64 by means of a rivet bolster. A recess 152 near the bottom right of the rear panel 64 provides access for a grab handle 153. Another recess 154 near the upper right of the rear panel 64 provides an opening for a floodlight to illuminate the area at the rear of the containerized field kitchen.

The sub-floor 88 providing the base and skid of the containerized field kitchen is shown in FIGS. 6 and 7. Two pairs of forklift pockets 92 and 94 in the base 88 define two pair of slots into which the tines of a forklift can be slid. These slots or pockets 92 and 94 are perpendicular to the longitudinal walls 61 and 62 so that a forklift can be used to load the containerized field kitchen 20 onto a transport vehicle. A cavity 96 molded in the right of the floor 88 is provided to receive a waste water tank. A storage area 90 on the roadside of the floor 88 with a door leading to it, provides a storage area where items such as the jacks 104 and a canvas blackout curtain can be stored. Since the generator can be quite heavy, the base 88 includes a plurality of generator supports 100 to help prevent the generator from moving or crashing through the floor when the unit 22 is dropped onto the ground from a helicopter.

The base 88 also includes a plurality of solid elongated parallel tubes 86, such as four cylindrical annular tubes, which are supported in a skid basement. The tubes 86 can telescope outwardly of the curbside panel 61 as shown in dotted line in FIG. 1 to engage and support the grates 84 providing the walkways and decks 85. The tubes slide inwardly completely within the interior of the unit 22 during storage, transport and when the grates 84 are not being used as walkways. Detachable abutment stops, such as removable pins, are provided to limit the outward movement of the tubes 86 to prevent the tubes 86 from being removed when the ramps 85 are setup for use. The tubes 86 support the composite decking 85. The deck 85 provides platforms supported by the tubes 86 on which the soldiers or other customers can climb to reach the serving windows 110. The curbside panel 61 defines shallow recesses 120 below the food service windows 110 where the removable grates 84 are stored. The decks 85 insert into the wall panel 61 of the container 22 during transit and periods of inactivity (non-use). Customers can walk up a staircase (stairs) and stand on the deck when food is being served. At the end of the base 88 is an entry step 101 which helps provide access for entering the containerized field kitchen 20. Collapsible stairs and steps 108 can be positioned outside the entry door 151. The stairs can be stored in canvas storage bags.

FIGS. 6 and 7 depict the nonskid one-piece floor liner 105 which is molded or otherwise made of a composite material. The floor liner 105 has an upper nonskid surface 106 and a built-in drain system comprising troughs 107 for hosing down and cleaning the floor. The floor liner 105 is water-impermeable and seamless. The floor liner 105 sits on top of the floor 81. The center span of the floor liner 105 can be backed with composite and a second skin for stiffness. The floor liner 105 is preferably washable. In the illustrative embodiment, the floor liner 105 is approximately 7 and ½ feet wide and 16 feet long. There is an integral floor drain trough 107 at the right end of the nonskid aisle 106, adjacent the front end 63 of the unit 22. The refrigerator is positioned above the generator and a step 108 can be provided near the front of the unit 22 to facilitate access to the refrigerator.

In order to decrease vibration noises from equipment in the containerized field kitchen, such as the generator, heater, air conditioner, etc., and to provide for a quieter kitchen environment, the containerized field kitchen can be equipped with ducting 160 fabricated or molded of a shape-sustaining, sound-attenuating, flame-resistant material, preferably acrylic ployvinylchloride (PVC) for best results. The tubular ducts 160 can define air flow passageways for heating and air conditioning. The ducts 160 can be positioned along the ceiling 56 above the center aisle 106, from the front end wall 63 to the rear end wall 64, and can be positioned adjacent the top of the interior divider wall 57. Vents can communicate with the ducts 160.

The surfaces of the walls 54 can be coated with a polyester gelcoat to withstand abrasive scrubbing, stringent cleanup and sanitizing (sanitation) often required after a biological or chemical attack. The polyester gelcoat protects the color and finish of the walls 54. The polyester gelcoated panels and walls 54 also help resist corrosion and biological and chemical attack.

Desirably, the containerized unit 22 is formed of composite panels 66 and there is not steel or aluminum frame that provides significant auxiliary structural support for the panels 66. The unit 22 is designed with doors 72 and openings 68 on all four walls 61-64 in contrast to prior art cargo containers which merely have a barn-type door at one end of the unit. Forklift pockets 92 and 94 are designed into the base 88 of the container 22 to facilitate loading of the containerized field kitchen via forklift trucks. Decks 84 insert into a wall 60 of the unit 22 during transit and assemble to provide improved access to the food or beverage dispensing windows 110. The containerized field kitchen includes a one-piece floor liner 105 which as a nonskid surface 106 and a built-in drain system 107 for hosing down and cleaning the floor. The unit 22 is constructed to withstand a drop of two feet from a helicopter on to the ground.

Among the many advantages of the novel containerized field kitchen and high grade containerized field kitchen are:

1. Outstanding performance even at extremely cold and hot ambient outside temperatures ranging from −50 degrees F. to +120 degrees F.
2. Superb access to work stations in the kitchen for better service, repair, maintenance, and adjustments and for enhanced supply and delivery of food.
3. Excellent structural strength for rapid transport by helicopters and other aircraft.
4. Can be quickly assembled and easily dismantled for rapid deployment.
5. Good resistance to wind, sand storms, hot sun, rain, snow, sleet, and hail.
6. Enhanced resistance to chemical attack, corrosive gases, and acid rain.
7. Superb quality.
8. User friendly.
9. Simple to operate.
10. Compact.
11. Economical.
12. Reliable.
13. Convenient.
14. Efficient.
15. Effective.

Although embodiments of the invention have been shown and described, it is to be understood that various modifications and substitutions, as well as rearrangements of parts, components, equipment, and process steps, can be made by those skilled in the art without departing from the novel spirit and scope of this invention.

What is claimed is:

1. A mobile kitchen, comprising a movable containerized field kitchen unit with interconnecting modular components comprising composite upright wall panels peripherally surrounding and cooperating with each other to define interior stations, each of said wall panels defining at least one access opening for access and service to at least one of said interior stations, said interconnecting modular components including a top wall providing a composite roof positioned above and connected to said upright wall panels, and a floor providing a base positioned below and operatively connected to said upright wall panels, said upright composite upright wall panels cooperating with said composite roof and floor;

said base defining a set of forklift pockets for receiving tines of a forklift truck and grab hooks of a helicopter; and said composite upright wall panels intersecting and cooperating with said composite roof for defining molded composite corners with openings for receiving and lifting by a crane and grab hooks of a helicopter.

2. A mobile kitchen in accordance with claim 1 wherein said floor has a unitary molded liner defining at least one drainage trough and having a skid-resistant surface.

3. A mobile kitchen in accordance with claim 1 including a plurality of telescoping tubes operatively associated with said base and an inclined composite grate supported by said telescopic tubes for providing a walkway and deck.

4. A mobile kitchen, comprising:

beverage station means for providing an area for serving coffee and other beverages;

food dispensing station means positioned adjacent said beverage station means for providing an area for dispensing food;

composite housing means for removably enclosing said beverage station means and said food dispensing station means, said composite housing means comprising impact-resistant wall means having interconnected foam core panels having a structural strength greater than aluminum and lighter than aluminum for easier less expensive air transport of said mobile kitchen;

said composite housing means including forklift tine-receiving means for receiving tines of a forklift truck; and said composite housing means defining slots for receving and engaging helicopter grap hooks.

5. A mobile kitchen in accordance with claim 4 including a unitary floor liner with a skid-resistant surface, a built-in drain system, and at least one step for elevation and access to a refrigerator.

6. A mobile kitchen in accordance with claim 4 wherein said housing means includes longitudinal and lateral foraminous panels providing front and back ends and sides of said mobile kitchen, each of said foraminous panels having at least one access opening for communicating with one of said station means, and closure means operatively connected to said foraminous panels for closing said access opening.

7. A mobile kitchen, comprising:
a floor assembly;
a ceiling;
upright walls extending substantially vertically between and connected to said floor assembly and said ceiling;
said floor assembly comprising at least one removable deck comprising a matrix of interconnected composite grating bars supported by a set of removable support beams, a skid for slidably receiving and supporting said beams, said skid providing a base having forklift pockets comprising tine-receiving slots, a unitary floor liner positioned above and supported by said skid, said floor liner having a slip-resistant surface and at least one drainage trough, and said floor assembly including a foraminous ramp secured to one of said walls.

8. A mobile kitchen, comprising:
a transportable containerized field kitchen unit defining a series of interior stations including a beverage station, a food dispensing station, a cooking station, a refrigeration station, a power station, an exhaust station, and an illumination station;
said transportable containerized field kitchen unit having a floor assembly positioned below said interior stations, said floor assembly including a composite formaminous ramp, said transportable containerized field kitchen having upright composite walls extending upwardly from and connected to said floor assembly and peripherally surrounding said interior stations;
said upright composite walls including substantially parallel longitudinal walls and lateral walls extending between and connecting said longitudinal walls;
each of said upright composite walls defining at least one access opening for access to one of said interior stations within said transportable containerized field kitchen unit; and
closure means comprising a member selected from the group consisting of a door and a shutter, said closure means being pivotally connected to said upright walls and being manually moveable for closing said access opening;
a top composite wall providing a roof above said interior stations, said roof secured to said upright composite walls in the absence of a metal support frame; and
said upright walls comprising a curbside composite panel positioned adjacent said food dispensing station, said curbside composite panel defining an array of access openings including a food service window, a service opening comprising a service chamber, an illumination opening for access to said illumination station, an exhaust opening communicating with said exhaust station, and an electrical panel opening communicating with said power station;

a roadside composite panel positioned adjacent said beverage station, said roadside composite panel defining a set of access openings including a beverage window for access to said beverage station, a generator opening for access to said power station, an exhaust fan opening communicating with said exhaust station, and a floodlight opening communication with said illumination station;

a front composite panel positioned in proximity to said refrigeration station, said front composite panel defining a series of access openings providing a refrigeration hatch for access to said refrigeration station, vent and circulation passageways communicating with said power station, a fuel filling opening providing a filler neck communicating with said power station, and a water conduit communicating with a sink; and a rear composite panel positioned across from said front fiberglass panel, said rear composite panel defining a plurality of access openings including an entranceway for passage of kitchen personnel, a grab handle recess, and a light opening communicating with said illumination station.

9. A mobile kitchen in accordance with claim 8 including a moveable canvas blackout curtain for substantially covering said access opening.

10. A mobile kitchen in accordance with claim 8 wherein said closure means includes a rivet bolster strip pivotally connecting said member comprising said door or shutter to one of said upright composite walls.

11. A mobile kitchen, comprising:
a moveable containerized field kitchen unit comprising a transportable impact-resistant food service structure constructed of interconnecting assembled modular components for transport by at least one transport carrier selected from the group consisting of an aircraft, ship, train, truck, trailer and an all terrain vehicle, to a remote field location and site to feed field personnel at said remote field location, said modular components being capable of shipment in a bulkhead, cargo hold, and pressurized cabin;
said containerized field kitchen unit defining an array of interior service stations including a beverage station providing an area for serving coffee and beverages; a food dispensing station providing an area for dispensing prepared food; a cooking station providing an area for cooking food in at least one piece of cooking equipment selected from the group consisting of convection ovens, skillet, steam table, coffee urns, and grill; a refrigeration station for refrigerating food in a refrigerator; a power station for supplying electrical power with at least one piece of power equipment selected from the group consisting of an electrical control panel, a generator, and power supply; an exhaust station for discharging smoke and fumes to the atmosphere with an exhaust fan; and an illumination station for illuminating said cooking, food dispensing and beverage stations with overhead lights;

said containerized field kitchen unit providing a substantially rigid weather-resistant assembly comprising composite walls including a top wall providing a ceiling and roof above said stations, a bottom wall comprising a floor assembly below said stations, and upright composite walls extending substantially vertically between and connected to said top and bottom walls for peripherally surrounding said interior stations, said upright composite walls intersecting and cooperating with said top wall to provide corners with opening for receiving grab hooks of a crane and helicopter;

said upright composite walls including substantially parallel longitudinal side walls and substantially parallel lateral end walls extending between and connected to said longitudinal side walls, said upright composite walls comprising composite panels, said composite panels having a strength-to-weight ratio greater than aluminum and steel and being lighter than aluminum and steel for easier less expensive transport in said transport carrier, said longitudinal walls comprising a curbside composite panel and a roadside composite panel, said lateral end walls comprising a front composite panel and a rear composite panel, each of said upright walls defining at least one access opening for access and service to at least one of said interior stations, a closure assembly comprising a manually moveable closure member selected from the group consisting of a door, shutter, and canvas blackout curtain for substantially closing said access opening, and a rivet bolster strip adjacent said access opening for pivotally connecting said closure member to said upright wall;

said floor assembly having
- at least one composite deck comprising a moveable platform and providing a walkway assist grate and a foldable deck, said deck being collapsible to a storage position adjacent one of said upright walls during transport in said transport carrier;
- a series of substantially parallel tubes providing a set of slidable support beams for sliding below, engaging and removably supporting said deck;
- a base comprising a skid for slidably receiving and supporting said tubes, said base providing a set of pockets for receiving grab hooks from said helicopter and defining tine-receiving slots for receiving tines of a forklift truck for enhanced loading of said containerized field kitchen unit on said transport carrier;
- a unitary composite floor liner positioned above and supported by said skid, said composite floor liner having a slip-resistant surface and at least one drainage trough;
- a washable foam liner positioned against and engaging said composite floor liner;

said curbside composite panel positioned adjacent said food dispensing station and defining a set of recesses and an array of access openings including at least one food service window, a service opening providing a service compartment for access to equipment within said stations, an illumination opening for access to said illumination station, an exhaust opening communicating with said exhaust station, an electrical panel opening communicating with said power station, and said curbside fiberglass panel defines at least one recess for storing said deck;

said roadside composite panel positioned adjacent said beverage station and defining a set of access openings including a beverage window for access to said beverage station, a generator opening for access to said power station, an exhaust fan opening communicating with said exhaust station, and a floodlight opening communicating with said illumination station;

said front composite panel positioned in proximity to said refrigeration station and defining a series of access openings providing a refrigeration hatch for access to said refrigeration station, vent and circulation passageways communicating with said power station, a fuel filling opening and spout providing a filler neck communicating with said power station, and a water conduit communicating with sink; and said rear composite panel positioned across from said front composite panel and defining a plurality of access openings including an entrance for passage of kitchen personnel, a grab handle recess, and a light opening communicating with said illumination station.

12. A mobile kitchen in accordance with claim 11 including a set of jacks for engaging and elevating said floor assembly above the ground.

13. A mobile kitchen in accordance with claim 11 wherein said walkway assist grate comprises a foraminous matrix of interconnected composite grating bars.

14. A mobile kitchen in accordance with claim 11 said curbside composite panel defines a set of food service windows and a set of substantially rectangular recesses positioned in substantial horizontal alignment below said food service windows, and said floor assembly comprises a set of substantially rectangular composite grates for providing an inclined walkway to said food service windows during use and for engaging said set of recesses of said curbside panel during storage and transport.

15. A mobile kitchen in accordance with claim 11 including a laterally extending composite interior divider panel providing an internal wall positioned between and disposed substantially parallel to said front and rear panels and connected to said curbside composite panel and to said roadside composite panel, said composite interior divider panel separating said power station from said cooking station, and said composite interior divider panel defining at least one opening for access to said refrigeration station.

16. A mobile kitchen in accordance with claim 11 including at least one tubular duct comprising a shape-sustaining sound-attenuating material and defining an air flow passageway for heating and air conditioning, and said duct comprising an acrylic polyvinylchloride duct positioned in proximity to said ceiling of said containerized field kitchen unit.

* * * * *